INVENTOR.
Edwin R. Lane.

ATTORNEYS

March 25, 1947.                E. R. LANE                    2,418,036
        DISPENSING CASING WITH VALVE OPERATING MEANS FOR A
                CARTRIDGE WITH A DISPENSING VALVE
                    Filed July 31, 1943         3 Sheets-Sheet 2

INVENTOR.
Edwin R. Lane.
BY Corbett, Mahoney & Miller
ATTORNEYS

INVENTOR.
Edwin R. Lane.

ATTORNEYS

Patented Mar. 25, 1947

2,418,036

UNITED STATES PATENT OFFICE 2,418,036

DISPENSING CASING WITH VALVE OPERATING MEANS FOR A CARTRIDGE WITH A DISPENSING VALVE

Edwin R. Lane, Bexley, Ohio

Application July 31, 1943, Serial No. 496,867

2 Claims. (Cl. 222—3)

My invention relates to dispensing devices. It has to do more particularly with an improved dispensing device or spraying apparatus for various uses and purposes such, for example, as the controlled dispensing of liquids, solids, gases or air, in which the discharge of the particular medium is effectively controlled by the user of the device.

One of the particular uses for the present invention is in connection with the treatment of disturbances or infections in the nasal passages or tract and in the region of the sinuses. Devices made in accordance with my invention are, however, capable of wide use in various fields and are also capable of dispensing medicament under pressure for hygienic purposes and for the treatment of rectal disorders and disturbances, as well as for treatment of conditions existing in the regions of the nasal passages and allied regions of the head and throat.

Other important uses for the present invention are in connection with the dispensing of liquids, such as perfume or toilet waters, insecticides or the like, or crystalline, granular or powdered materials or substances of various kinds; the invention finding another particular use in connection with the dispensing of carbon dioxide ($CO_2$) under compression for the purpose of freezing tissue, or the like. In this latter connection, devices made in accordance with the present invention are particularly well adapted for use as standard equipment in the medical kits of physicians and surgeons, as well as in first aid kits, such as those used by military men and women in the field and elsewhere.

Many other uses not mentioned above can be made of the improved dispensing devices made in accordance with my present invention and it is to be understood that the mere mention of a small number of its possible uses is not intended, in any wise, to limit the scope of the present invention.

It is well known that physicians who specialize in the treatment of nasal and sinus diseases and infections do not approve of the use of many of the common and well known so-called inhalers for the alleged treatment of nasal and kindred infections, for the reason that primarily the mode of use of such devices requires the patient undergoing self-treatment with an inhaler, to inhale through the nostrils in an effort to induce the inhalant to enter the nasal passages. Such action has a tendency to irritate rather than to soothe the infected regions for the reason that germs and infection are drawn in deeply by the inhaling action and often enter the region of the sinuses with painful and serious results.

One of the important purposes of the present invention in connection with one particular use for which it is adapted, is to provide an improved dispensing device or spraying apparatus for treatment of the nasal passages and the sinus region which does not require any forced inhalation by the patient, my improved device serving to propel the fluid into the passages and/or cavities of the nasal tract without any effort whatsoever on the part of the user of the device.

One of the objects of my invention is to provide an improved dispensing device or spraying apparatus which is of relatively simple construction, easy and inexpensive to manufacture and one which contains a spraying medium which may be discharged or dispensed by the device, under pressure, thus eliminating any effort whatsoever on the part of the user of the device to cause the fumes and/or the liquid for treatment to enter the nasal passages.

Another object of the present invention is to provide a device of the foregoing character which is entirely self-contained and one in which the discharge of the medium dispensed is at all times under the control of the user of the device.

Another object of the present invention is to provide an improved dispensing device of any desired shape or size capable of use in various ways and for various purposes, and one in which the medium to be discharged is maintained under pressure and released only as desired by the user or operator.

Another object of the present invention is to provide an improved dispensing device or apparatus of the self-contained pressure type, in which the medium to be discharged is mixed with air under pressure or gases, such as compressed air or, for example, carbon dioxide ($CO_2$), and contained in inexpensive replaceable and interchangeable cartridges, capsules or packages provided with manually controlled means to permit the release of the medium at predetermined times.

A further object of the present invention is to provide an improved device or apparatus of the foregoing character in which a single casing or housing may be used repeatedly with quick detachable refills, such as cartridges, capsules, containers or packages, which contain the desired medium to be dispensed or discharged by the device.

A further object of the present invention is to provide a dispensing device comprising a casing and a removable medium-containing cartridge which are arranged in telescopic relation; another object of the invention being to provide such a device with manually controlled means for releasing the medium from within the cartridge to be discharged through the discharge opening or outlet of the device as desired; it being a further object of the invention to provide a device of this nature in which the removable cartridge or package is provided with releasable valve means or mechanism to permit the discharge of the contents of the cartridge as desired; another object being to provide a device in which the casing or housing, and the detachable or removable charged cartridge, are in telescoping relation and capable of movement relative to one another for effecting the release of the medium from within the cartridge to be expelled or discharged through a discharge opening, nozzle, or perforated cap on the casing.

A further object of the invention is to provide an improved dispersing device for various uses in which the device is provided with a passageway for the movement of the medium contained in the removable cartridge of the device to the discharge opening thereof, in which said passageway is provided with baffle means and/or a filter or saturator through which the fluid or other medium passes before being discharged from the device.

Another object of my invention is to provide an improved pressure-containing and dispensing cartridge, package, or container having self-contained valve means permitting charging or recharging, as well as dispensing or discharging of the charged contents of said cartridge.

A further object of my invention is to provide an improved cartridge or container capable of ready application to the casing or housing portion of a dispensing device, and which is provided with self-contained valve means capable of being actuated to release the medium, in which said valve means is so arranged with relation to a wall or other portion of the cartridge to prevent accidental actuation of the valve means during handling, shipment or other use of the cartridge.

Another object of the present invention is to provide a dispensing device of the foregoing character having means for maintaining the discharge opening or exit port or ports of the device free from clogging and obstruction during use.

Another object of the present invention is to provide an improved dispensing device having a permanent case portion or housing provided with a removable cartridge or capsule containing fluid under pressure, charged if desired, with a suitable medicament, or one in which the cartridge or capsule is provided only with the propelling medium and wherein the device is provided with separate medicament-saturated means through which the pressure medium passes on its way to the discharge opening or nozzle of the device.

A further object of the present invention is to provide an improved dispensing device of the foregoing character having removable and replaceable cartridges for containing pressure, in which the cartridges are provided with fluid or other medium-releasing valves capable of discharging the contents, as well as being capable of permitting the cartridge to be recharged.

A further object of the present invention is to provide an improved dispensing device or spraying apparatus having a detachable or removable nose-enclosing shield or hood member mounted thereon.

The above and other objects and advantages of the present invention will be apparent from the following description and appended claims when considered in connection with the accompanying drawings forming a part of the present invention, wherein like reference characters designate corresponding parts in the several views.

Figure 1:
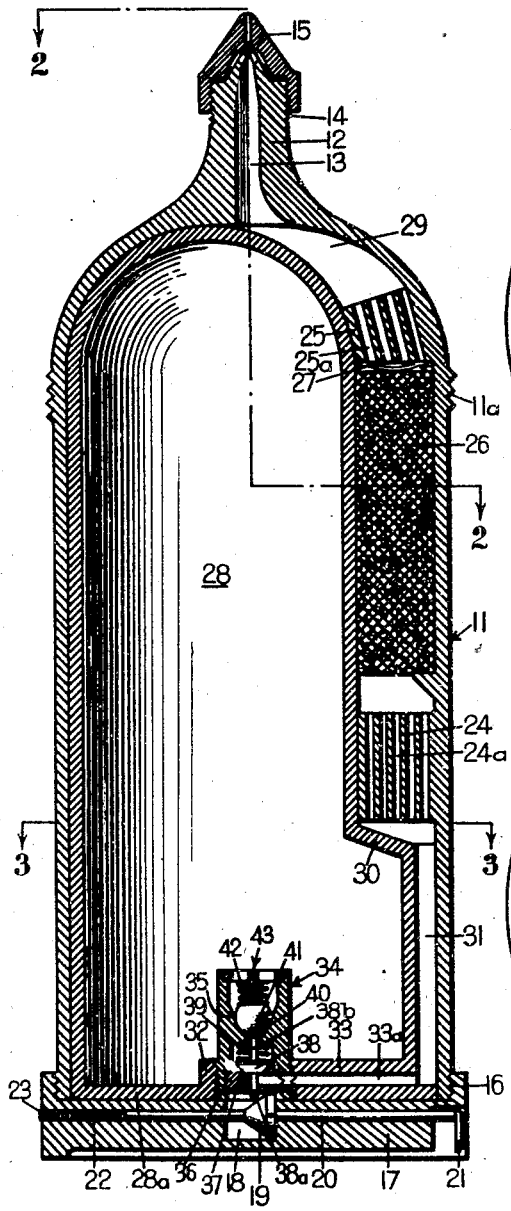
Figure 1 is a vertical sectional view through one form of device or apparatus embodying my invention.
Figure 2:
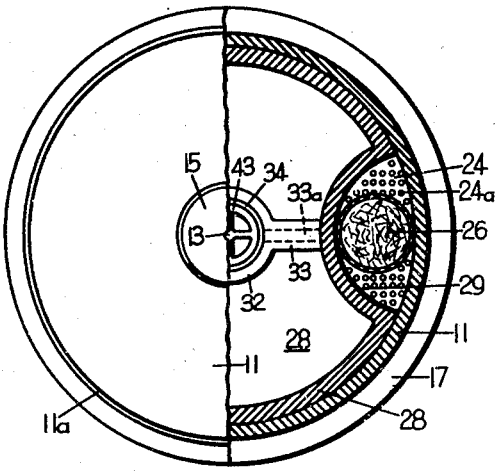
Figure 2 is a sectional view taken substantially along the line 2—2 of Figure 1 looking in the direction of the arrows.
Figure 3:
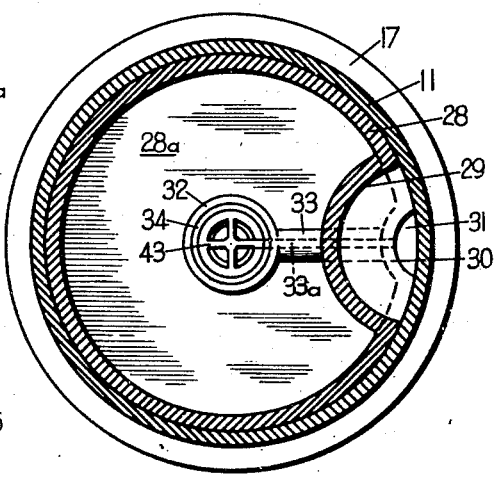
Figure 3 is a horizontal sectional view taken substantially along the line 3—3 of Figure 1, looking in the direction of the arrows.
Figure 4:
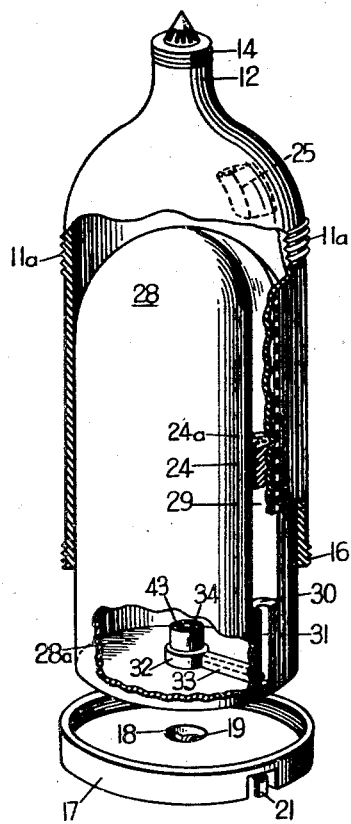
Figure 4 is a perspective view of the device of the preceding figures, shown on a somewhat smaller scale and with the parts separated, sectioned, and partly broken away for purposes of clarity.

Device made in accordance with my invention may be of various sizes and shapes as stated above and the casing or housing of the device, as well as the removable or detachable cartridges or capsules therefor, may be formed from any suitable material such, for example, as metal, glass, thermoplastic, or from thermosetting resins of various types and kinds. Various other materials may be employed within the scope of the present invention.

Referring now particularly to Figures 1 to 4, inclusive, of the drawings, I have shown one embodiment or form of my invention. In this form, the case or housing is shown as a whole at 11 and comprises a discharge end portion or neck 12 having a discharge passage or port 13 formed therein. If desired, the portion 12 may be externally threaded at 14 to receive and support an internally threaded nozzle or perforate cap or closure 15 in association with the discharge port or outlet passage 13.

In accordance with the present form of the invention, the opposite end of the casing 11 may be externally threaded at 16 to receive and support an internally threaded cap member or closure 17. As shown, this cap member is provided with a substantially centrally located recess 18 within which is located a tapered or substantially frusto-conical valve-actuating member 19 which, as shown, is keyed or pinned to a rod or shaft 20 which extends through a suitable bore provided in the cap. The outer projecting end of the rod 20 carries an actuating finger or button 21. The opposite end of the rod 20 engages the inner end of a compression spring 22 located within the bore and held in place by a machine screw or the like 23 against which the outer end of the spring seats. The tendency of the spring 22 is to maintain the actuating device for the valve in the position in which it is shown in Figure 1.

As shown, the casing is provided in a wall thereof with an inwardly projecting vertically perforated block or baffle member 24 which projects inwardly from the wall, and with a similar block or baffle member 25 located adjacent the discharge end of the casing. It is to be noted that the perforations or passages 24a are of somewhat smaller diameter than the corresponding passages 25a of the upper member 25.

The present form of the invention also embodies the use of a filter or similar member shown at 26. This filter may be formed from gauze or other suitable porous material and as shown is in the form of a column which is disposed between the baffle members 24 and 25. The purpose of the filter is to remove and collect any foreign materials or particles appearing in the fluid or liquid under pressure which passes through the baffle members and the filter. The filter means, as shown, is removably supported in place by means of a flat spring 27 which may be attached to the wall of the casing and which has a portion engaging an end of the filter pad or member 26 to hold it in place. If desired, the member 26 may be in the form of a saturator.

The casing 11 of the present form of my invention is shown as tubular and is adapted to receive, in telescopic relationship, a removable or detachable cartridge, capsule, container or package, shown as a whole at 28, and which is of generally similar shape and contour to that of the casing. It will be noted that a longitudinal wall of the cartridge 28 is provided with a longitudinally extending groove or recess 29 having at its lower end a substantially horizontal wall or abutment portion 30 below which a substantially semicircular longitudinal groove 31 extends. The base portion or bottom 28a of the cartridge is, as shown, provided with an upstanding centrally disposed portion or boss 32 and with a raised outwardly extending or radiating portion 33 having a passageway or bore 33a formed therein which communicates with the interior of the boss at one end and with the passage 31 at its other end. It will be observed, see particularly Figures 1, 2 and 4, that the depression or cavity 29 formed in the cartridge is substantially semicircular in cross section and provides means to receive the baffle members 24 and 25 and the filter device 26 when the cartridge is moved endwise into telescoping relation with the casing 11. It will also be seen that the depression, groove or passageway 31 communicating with the depression 29 at the upper end provides, with the adjacent wall of the casing 11, a portion of the discharge passageway for the device and that the depression 29, also in association with the casing wall, provides an enlarged continuation of this outlet or discharge passageway for the device and communicates at its outer end with the discharge passage or outlet port 13 formed at the discharge end of the casing. Thus, by virtue of the transverse passageway 33a and the intercommunicating longitudinal passageways 31 and 29, the interior of the boss 32 it in direct communication with the outlet or discharge passage or opening 13.

The interiorly threaded boss 32 of the cartridge or container 28 provides means for receiving and supporting a valve assembly which is shown as a whole at 34. As seen in Figure 1, the valve assembly comprises a body portion or member 35 having a depending ported threaded flange 36 which is adapted to be screwed in place into the boss 32. The valve body is provided at its lower end with a valve seat 37 against which a poppet-type valve 38 is normally seated under the action of a compression spring 39 which finds a seat at its upper end against an inwardly projecting portion or abutment formed in the valve casing or body member 35. The valve body or casing is also provided with a substantially frusto-conical seat portion 40 against which a check valve 41 is normally seated by virtue of the provision of a compression spring 42 whose upper end finds a bearing or support against a perforate grill or case member shown as a whole at 43, this latter member being threadedly engaged with a seat or socket formed in the valve body or casing 34. As shown, merely by way of example, the check valve 41 is a ball valve.

With the parts in their positions as shown in Figure 1, the poppet valve 38 and also the ball check valve 41 are firmly held against their respective seats by means of the compression springs 37 and 39, respectively. The poppet valve 38 is provided with a depending stem portion 38a and with an upwardly projecting stem portion 38b. The depending portion 38a projects through the bottom wall of the valve seat portion for the poppet valve and into the path of movement of the valve-actuating member 19. The upwardly projecting stem portion 38b, in its normal position, with the cartridge sealed against the escape of fluid, contacts the ball check valve 41.

When it is desired to discharge a portion of the compressed air-impelled or gaseous content or medium in the container 28, the user of the device simply applies pressure to the finger 21 to move the valve actuator 19 inwardly, or to the left of this figure, to lift the poppet valve 38 and also the ball check valve 21 off their respective seats to permit a portion of the contents of the cartridge to escape through the passages 33a, 31, 21, and 29 to the discharge passage 13 to be discharged by the nozzle or perforate cap member 15. Upon release of pressure upon the finger 21, the compression spring 22 returns the valve actuator 19 to its out-of-use position as shown in Figure 1, permitting the valve-actuating springs 42 and 39 to function to reseat the valves and prevent any further escape of the fluid or other content from within the cartridge 28.

The function of the perforate block member or baffle 24 shown in connection with the present form of the invention, is to break up, separate or diffuse the stream of fluid into a plurality of smaller streams prior to contact with the filter device 26, whereas the purpose of the block member or baffle 25 is to again break up, divide or separate the stream of fluid into a plurality of smaller streams just prior to its discharge by the discharge passage 13 of the device.

When the cartridge 28 of the present form of the invention is employed with the dispensing device or apparatus 11 of this form for applying medicament under air pressure, the medicament is included or placed in the cartridge or container 28 along with a suitable amount of compressed air. For a cartridge or container such as that shown at 28, which is used with a device for discharging or dispensing a medicament-saturated solution and wherein the dispensing device is of the usual size for applications to the nasal passages, approximately 15 cc. of medicament is employed with air under pressure of approximately 150 to 200 lbs. per square inch.

When, however, liquids or solutions other than those containing medicament are to be dispensed, the cartridge or container 28 may contain either compressed air at a pressure of approximately 150 lbs. per square inch as the dispelling medium, or any suitable gaseous medium at desired pressure. This is particularly true where the dispensing device is employed for dispensing perfume or other scented liquids or solutions, or camphor in any of its forms, insecticides, or household ammonia.

Figure 5:
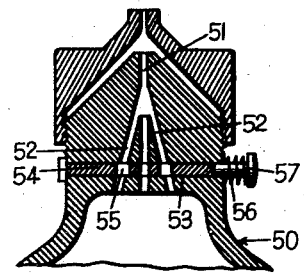
Figure 5 is a fragmentary vertical sectional view through the discharge end portion of a device embodying the present invention and illustrating one form of discharge passage-clearing means embodying my invention.

Referring now particularly to Figure 5 of the drawings, I have shown in that figure a device for maintaining the discharge port or passage or passages of a dispensing device free from obstructions, such as the formation of ice when the device is being used for dispensing, for example, compressed carbon dioxide. In this figure, a fragment of the dispensing device is shown as a whole at 50 and has a discharge passage or port 51 formed in the outlet end thereof which, as shown, is in communication with a pair of discharge passages 52 leading from the interior of the casing 50. As stated previously, the dispensing device of the present invention has for one of its uses, the discharge of a suitable freezing medium for use by physicians, surgeons, and others for the purpose of freezing tissue. In this connection, any suitable removable and, if desired, refillable or rechargeable cartridge or container made in accordance with my invention may be used with the casing 50. Such container or cartridge would contain, for example, a supply of compressed carbon dioxide ($CO_2$), which could be discharged through the discharge passages 51 and 52 as desired, such discharge being under the control of the operator by virtue of some suitable valve-actuating device such, for example, as the device 19 of Figures 1 to 4, inclusive.

The discharge end portion or neck of the casing 50 is provided with a transverse slot or passageway 53 to receive and support a reciprocable obstruction-removing or de-icing slide valve or perforated plate member 54 having a pair of ports or perforations 55 formed therein. The valve member 54 is normally maintained in its position in Figure 5 by virtue of a compression spring 56 engaging the inner face or surface of a button 57 carried by the valve. In this position it will be seen that the ports or openings 55 formed in the valve are in registry with the discharge passages 52. As is well known, when carbon dioxide under compression is subjected to the atmosphere, it immediately freezes. For this reason, it is possible that the discharge passages 52 and 51 of the dispensing casing 50 might become clogged and rendered temporarily unfit for use because of the formation of ice therein. To eliminate this possibility, the slide valve or ice-removing device has been provided. To eliminate any possibility of clogging or blocking of the discharge passages, it is merely necessary to reciprocate the valve by the application to and the release of pressure upon the button or finger case 57.

Figure 6:
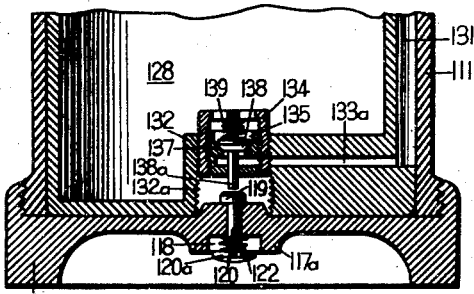
Figure 6 is a fragmentary vertical sectional view on substantially the same scale as Figures 1 to 3, inclusive, showing one form of valve means for a removable cartridge or container of the refillable type embodying the invention.

In Figure 6 of the drawings I have shown a somewhat modified form of dispensing device embodying my invention. In this form I have employed a somewhat different type of valve assembly and also a somewhat modified form of valve-actuating device.

In the form shown in Figure 6, the casing or housing 111 is provided with a removable cap or cover portion 117 and with a removable and telescoping cartridge or container 128. As in the preceding form of the present invention, the cartridge is provided with a longitudinal depression providing a passageway 131 which is in communication with a transverse passageway 133a communicating with the interior of an inwardly projecting or upstanding and internally threaded boss member 132 formed in the base portion of the cartridge.

The valve assembly of the present form of the invention is adapted to be screw-threaded into position within the boss and is shown as a whole at 134. The valve assembly comprises, in addition to a body portion or casing 135, an adjustable and removable valve seat portion having a valve seat 137 with which a poppet-type valve 138 is adapted to be engaged. The valve is urged to its normal position upon the seat by means of a compression valve spring 139. The valve has a depending stem portion 138a which projects through an opening in the bottom wall of the valve seat portion of the assembly and into the space provided by the upstanding boss 132.

The removable head or closure member 117 is provided with a centrally disposed projection or boss 117a and with a pocket or recess 118. The closure member 117 carries a valve-actuating member provided with a valve stem-engaging head or portion 119 and with a depending integral stem 120 having at its outer end a removable finger piece or button 120a which is secured to the stem by means of a pin or key member which may be removed to permit the valve-actuating member and its stem to be assembled with the cover or closure 117. The valve-actuating portion 119 is normally maintained in position out of contact with the valve stem 138a, as seen in Figure 6 by virtue of a compression spring 122, one end of which seats against the wall of the socket 118, the other end being in engagement with the inner face of the control button or portion 120a.

It is to be noted that the valve stem 138a is in a protected position within the opening provided by the boss 132 and out of normal contact, thereby to eliminate any danger of accidentally unseating the valve 138 during handling or shipment of the removable cartridge or container 128. It is to be noted further that by virtue of the fact that the outer face or surface of the cap or closure member 117 is recessed or depressed as shown as 117a, the valve-actuating member 120, 120a, is likewise out of normal contact with any object which might serve to actuate it to contact the valve stem and thus unseat the valve 138 to permit the accidental escape of the pressure-impelled medium within the cartridge.

The present type of valve structure permits the cartridges or containers 128 to be refilled. For this purpose it is to be noted that the inner wall of the boss 132 is threaded at 132a to permit the application thereto of a pressure hose to unseat the valve 138 and permit the entry of pressure or fluid under pressure to the container or cartridge for refilling or recharging purposes.

Figure 7:
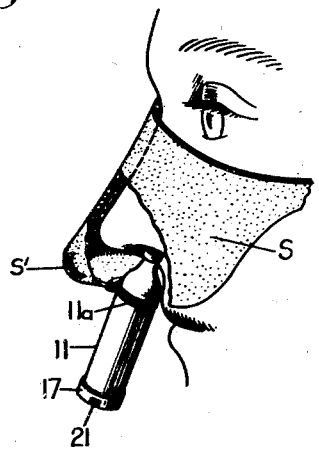
Figure 7 is a fragmentary elevational view, partly broken away, illustrating the application of a nose guard or hood attachment to a dispensing device, in accordance with the present invention.

In some instances when the present invention is being employed to treat diseases of the nasal and allied passages, it may be desirable to provide means for retaining, as long as possible, after a single discharge of medicament-saturated fluid from the dispensing device, the gases or fumes therefrom in the region of the nasal passages. To accomplish this purpose, and as seen in Figure 7 of the drawing, I have provided a removable or detachable guard or shield member shown as a whole at S which is capable of being threadedly engaged with and supported by the external threads 11a of the casing 11 of the dispensing device shown, for example, in Figures 1 to 4, inclusive, of the drawings. It will be seen that the shield member or hood S is shaped and proportioned so as to conform to the contour of the face in the region of the nose. By the use of this device it will be understood that a single discharge of medicament under pressure will be ample to treat both of the nasal passages simultaneously. To relieve any possible discomfort from the use of the hood or shield, it is provided with one or more vent openings or slots S¹ as seen in Figure 7.

Figure 8:
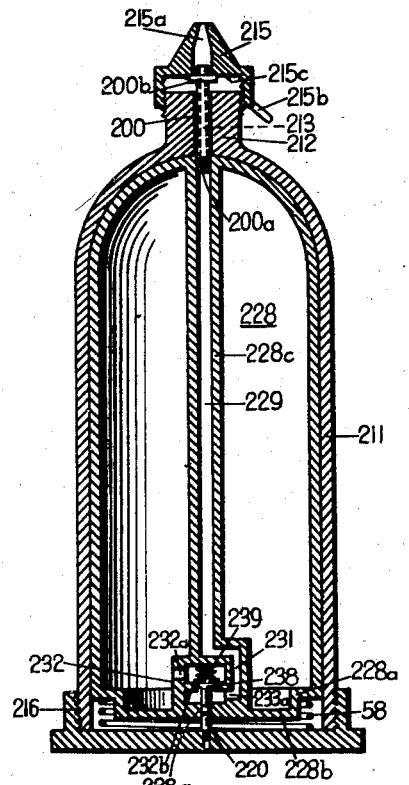
Figure 8 is a vertical sectional view through a dispensing device of a somewhat modified form embodying my invention.

A somewhat further modified form of dispensing device embodying my invention is disclosed in Figure 8. In many respects the structure shown in this figure is similar to that disclosed in Figures 1 to 4, inclusive, and Figure 6. In the present form of the invention, however, the cartridge or container for the medium to be dispensed is adapted to be moved by the movement of the cap or nozzle relative to the casing to release the contents of said cartridge.

The casing is shown as a whole at 211 and is provided at one end, namely the discharge end, with a neck portion 212 having a discharge passage 213 extending lengthwise thereof. In the present form, the neck portion 212 is provided with an adjustable and removable nozzle or cap member 215 having a discharge opening or passageway 215a formed therein. A handle or finger piece 215b is attached to the flange of the cap for the purpose of rotating and thus adjusting its position relative to the neck of the enclosing casing.

The opposite end of the casing 211 is exteriorly threaded at 216 and this end of the casing is normally closed by a removable head or closure member 217 having an annular internally threaded flange which cooperates with the casing threads 216 to hold the closure member in place on the body or casing 211. As shown, the cap 217 may be drilled to provide an internally threaded bore to receive and support the threaded shank portion of a pin or lug 220 which normally projects inwardly from the center of the closure 217.

The casing or body portion 211 of the device is shown as being of cylindrical cross section and is adapted to receive and support a removable and adjustable cartridge, capsule or container, shown as a whole at 228. The bottom or outer wall of the cartridge is indicated at 228a and has a recessed or depressed annular wall portion 228b. The cartridge or container 228 is also provided with a centrally disposed inwardly projecting portion or boss 232 having a laterally disposed opening or passage 232a formed therein and supports, in any suitable manner, an internal partition or wall 232b in which is formed a valve seat for a poppet-type valve to be described.

The capsule or container 228 is so formed as to provide a substantially centrally disposed tube-like member 228c which is formed integral with the inner or upper end wall of the cartridge and also with the boss or centrally disposed protuberance 232. The structure and formation is such as to provide a communicating passageway 229 having an outer or lower extension 231 and a transverse extension or connection 232a which is in communication with the space below the partition or wall 232b. While I have stated that the parts 228 and 232 are formed integral with the cartridge or container 228, it will be understood that they may be separate parts secured together in any desirable and convenient manner so long as a communicating passageway or series of intercommunicating passageways between the valve structure and the discharge passage 213, are provided.

The cartridge 228 is normally maintained in its inner position as shown in Figure 8 by virtue of the provision of a compression coil spring 58 which is interposed between the bottom wall 228a of the cartridge and the inner face of the removable closure member 217.

The container 228, and particularly the inwardly projecting portion or boss 232 thereof is provided with suitable valve mechanism for sealing the outlet of the cartridge and for permitting the release of its contents as desired.

The valve structure comprises a poppet-type valve 238 having a depending stem 238a. The valve is normally held on its seat formed in the wall 232b by means of a compression coil spring 239 which engages a wall of the boss portion at one end and which contacts the outer face of the valve at its opposite end. It is to be noted that when the parts are in the position in which they are shown in Figure 8, with the valve in sealing or closed position, a slight clearance or space is provided between the lower end of the valve stem 238a and the pin or stud 220.

The upper end of the tubular member 228c of the cartridge is internally threaded to receive the externally threaded end 200a of a tube member 200. It is to be noted that the upper end portion of the tube 200 is provided, as shown, with an annular projecting portion or abutment 200b which is, at all times, in contact with the adjacent face 215c of the adjustable and removable cap 215.

When it is desired to discharge a portion of the contents from within the capsule or cartridge 228, the handle or finger piece 215b of the nozzle or cap is engaged and the cap moved or rotated relative to the neck portion 212 of the casing. This operation will move or shift the container 228 inwardly or downwardly toward the removable closure member or cap 217 against the action of the compression spring 58. Thus, the valve stem 238a will be brought into contact with the fixed projection 220 to unseat the valve against the action of the compression spring 239. A portion of the contents of the cartridge which has entered the boss structure through the port or passageway 232a will now flow by or past the valve 238 and through the communicating passageways 233a, 231, 229 and the tube 200 to the nozzle or cap member 215 to be discharged therefrom through the outlet port or passage 215a. To reseat the valve, the discharge nozzle or adjustable cap 215 is rotated in the opposite direction to permit the spring 239 to reseat the valve and to allow the cartridge 228 to move back to its original position under the action of the compression coil spring 58. If desired, suitable filter means (not shown) may be disposed within the passageway 229, or elsewhere.

It will be understood that the device of the present form of my invention may be used for the dispensing of various materials or substances and that the cartridge will contain fluid and compressed air or some suitable gas such, for example, as carbon dioxide ($CO_2$). It is to be understood further that the cartridge or container 228 and the enclosing casing or body portion 211 of the device may be formed from any suitable material, some of which have been mentioned above, and may likewise be of any desired size, shape or proportion dependent upon the particular use to which the device is to be put.

Figure 9:
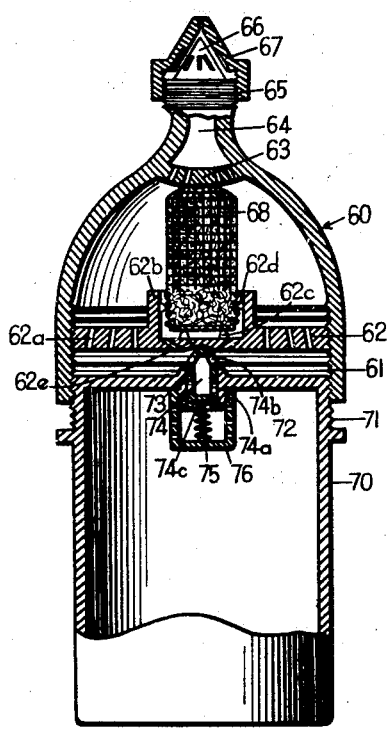
Figure 9 is a view similar to Figure 8 showing a further modified form of my present invention.

Referring now to Figure 9 of the drawings, a somewhat further modified form of dispensing device embodying the present invention, is shown. In accordance with this form, a casing or housing member shown as a whole at 60 is provided. The lower end portion of the casing is internally threaded at 61 to receive and support a wall, partition, or baffle member shown as a whole at 62. The outer end of the casing 60 is also provided with a partition wall or perforate baffle member 63 in the region of the discharge passage or port 64. The discharge end of the casing or housing is externally threaded at 65 and provided with a cone-like perforate or slotted tip 66. If desired, a nozzle member or perforate cap 67 may be threaded onto the discharge end or portion of the casing.

The baffle member or wall 62 is provided with a plurality of ports or passages 62a and with a centrally disposed boss 62b having a pocket or recess for receiving and supporting a filter member 68. The bottom wall of the recess or pocket is provided with a plurality of upstanding projections 62c upon which the base of the filter device 68 rests to hold it out of contact with the bottom wall of the pocket, and with additional inwardly projecting cone-like members or portions 62d which serve to maintain the filter device out of contact with the side walls of the pocket. It will be seen also that the baffle 62 is removable from within the casing 60 by virtue of the fact that it is threadedly engaged with the casing thread 61.

The present casing 60 is adapted to be employed in connection with a cartridge or container shown as a whole at 70 which has an externally threaded portion 71 at one end thereof. Thus, the cartridge 70 may be telescopically engaged with the casing 60 and removed therefrom when desired.

As in the preceding forms, the cartridge 70 is adapted to contain fluid under pressure which may be either compressed air or some suitable gas, depending upon the substance or solution or material which the cartridge contains, and is adapted to discharge its contents into the casing to be in turn dispensed or discharged through the discharge passage 64, the slotted cone 66 and the removable cap or nozzle 67.

As shown, the cartridge 70 is provided with a closed outer or bottom end wall and with an inner or top wall 72 having a hub portion or boss 73 which is externally threaded below the wall. A valve member 74 is mounted within the opening formed in the boss 73 and is provided with ports 74b in its upper end which, as shown, is of substantially frusto-conical shape and which is normally in engagement with the central portion or wall 62e of the baffle 62 when the parts are assembled. The cylindrical walls of the valve member are provided with ports or openings 74a and the valve has a recessed base or bottom wall 74c with which a compression spring 75 is in engagement. A perforated cage or cap member 76 is threaded onto the depending threaded portion of the boss member 73 and its bottom or end wall provides a seat for the opposite end of the compression spring 75. The member 76 is threaded onto the boss until its inner or upper wall edges contact the wall 72, as clearly shown in Figure 9.

The valve, as shown in Figure 9, is in closed position, thus sealing the cartridge against the escape of its contents. To unseat the valve 74 it is merely necessary to move either the casing 60 or the cartridge 70 relative to one another by rotating one of the members relative to the other member. By rotating, for example, the cartridge 70 in a clockwise direction as viewed in Figure 9, relative to the casing 60, the cartridge moves inwardly toward the baffle member or wall 62, to uncover the valve ports 74a thereof and bring them into communication with the ports or perforations in the cage member 76 to permit the escape of the fluid or other medium under air or gaseous pressure from the cartridge 70 through the valve ports or passages 74a and 74b, the baffle ports 62a, and similar ports or passages in the baffle or wall 63, to the discharge passage 64 and out through the nozzle or perforate cap of the device. After a sufficient quantity of the medium within the cartridge has been dispensed, the cartridge may be rotated in a counter-clockwise direction to permit the parts to return to their normal closed positions to again close the valve and prevent the escape of the medium from the cartridge.

It will be understood that if desired, some of the medium escaping from the cartridge 70 may be filtered by the filter device 68 or, if desired, the filter device 68 may be used as a saturating device to saturate the compressed air or gaseous medium which is allowed to escape from the cartridge past the valve 74, whether or not medicament is included in the air or gaseous content of the container 70.

Figure 10:
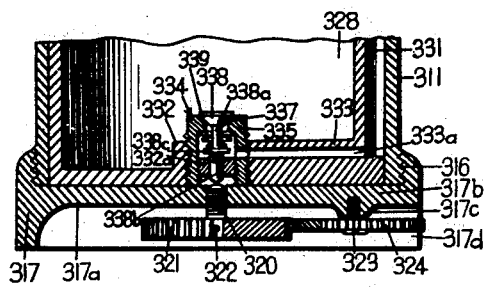
Figure 10 is a fragmentary vertical sectional view of the base portion of a device embodying the present invention and showing a modified form of valve-actuating means embodying my invention.

Referring now particularly to Figure 10 of the drawings, there is shown in this figure a further modified form of valve-actuating and cartridge content releasing means embodying my invention. The present form is generally similar to that shown in Figure 6 of the drawings and comprises an enclosing casing or housing shown as a whole at 311 having its lower wall portions externally threaded at 316 to receive and support the threaded annular flange of a removable closure member or cap, shown as a whole at 317. It is to be noted that the outer face or wall of the cap 317 is depressed or recessed at 317a to provide a space to receive or house the actuating mechanism for the valve. Such mechanism, as shown, comprises a centrally disposed threaded stud or shaft 320 which carries at its lower or outer end a suitable knurled wheel or gear member 321 which is keyed or pinned to the shaft at 322. The lower or outer wall 317b of the cap member or closure is provided with a boss or projecting portion 317c having a threaded bore or recess to receive a cap screw or bolt 323 which carries and supports a knurled wheel or gear 324 which, as shown, is of somewhat less thickness than that of the gear or member 321. The teeth of the two gears are in mesh. It will be seen that the cap member is slotted or relieved at 317d so that the periphery of the member 324 projects outwardly slightly beyond the peripheral edge of the cap to permit access to the knurled member. It will be understood that by rotating the member 324, the intermeshing member or gear 321 and its shaft 320 will be rotated either to project the shaft upwardly toward the cartridge or to retract it.

The case member or housing 311 of the device contains a removable cartridge, capsule or container member, shown as a whole at 328 and has a groove or depression formed in a longitudinal wall thereof so as to provide, with the inner wall of the casing 311, a longitudinal passageway 331. The base or lower end wall of the cartridge is provided with an internally threaded boss 332 and with a drilled outwardly extending or raised radiating portion 333 providing a transverse passageway 333a.

The threaded boss 332 receives and supports a removable and/or adjustable valve assembly shown as a whole at 334. The inner or upper face or wall of the valve casing or body 335 is provided with a valve seat 337 upon which a poppet-type valve 338 is normally maintained. The valve 338 has a depending stem 338a whose lower end is threaded and telescoped with a downwardly projecting pin or stud 338b which extends through a removable block-like member or guide 332a. The lower end of the portion 338b is positioned adjacent to but slightly spaced inwardly from the valve-actuating member 320. The upper end portion of the extension 338b is provided with an annular projection or stop 338c which supports the lower end of a tension coil spring 339 whose upper end engages an abutment formed in the valve casing or body 335. The spring functions to maintain the valve 338 normally on its seat 337 to seal the container or cartridge 328 against the escape of its contents.

When it is desired to discharge a portion of the contents of the cartridge or container, the knurled member or gear 324 is rotated which in turn rotates the associated gear member 321 and the threaded stud or member 320 to move it inwardly into engagement with the member 338b to lift the valve 338 from off its seat against the action of the spring 339. When in this unseated condition, a portion of the contents of the cartridge 328 is allowed to enter the valve casing or body and escape through the passages 333a and 331 to the outlet passage or discharge port (not shown) at the opposite end of the cylinder 311 in much the same manner as in the forms of my invention shown in Figures 1 to 4, inclusive, and 6.

Figure 11:
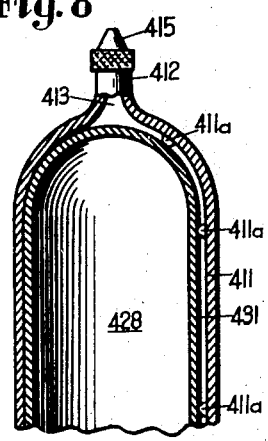
Figure 11 is a fragmentary vertical sectional view, on a somewhat smaller scale than some of the preceding views, showing another form of structure embodying my invention.

Referring now to Figure 11 of the drawings, I have shown in this figure another form of device embodying my invention wherein the passageway for the fluid or the like under pressure is provided by a space located between a wall of the outer casing, housing or shell and a wall of the removable container, package or cartridge which is located within the shell. In accordance with the present form of my invention, the casing or housing is shown as a whole at 411 and is provided in a wall thereof with a plurality or series of internal projecting lugs or members 411a which may be formed in any suitable manner. The neck portion 412 of the casing or housing has a discharge passage 413 formed therein which communicates with a dispensing or outlet cap or cover 415. As shown, the casing 411 is of round cross section.

Adapted to be located within the casing 411 is a removable and refillable container, package or cartridge, shown as a whole at 428. As shown, this cartridge is likewise of round cross section and is shaped to conform generally to the shape or contour of the outer casing. It is to be noted, however, that the cartridge or container 428 has a somewhat smaller diameter than that of the casing and is likewise of relatively shorter length than the casing. Therefore, when the cartridge is inserted within the casing, a space or clearance, as shown, is provided between the adjacent walls of the casing and the cartridge to provide an outlet passageway 431. This passageway is in communication with the discharge passage 413 and likewise in communication with a pressure control and escape valve mechanism (not shown) carried in any suitable location, by the cartridge 428.

The purpose of the lugs or projections 411a is to maintain the cartridge or container 428 in spaced relation with respect to a wall of the casing 411 to provide at all times a space or passageway, such as the passageway 431. The lugs or projections also serve to maintain the cartridge or container 428 in position against accidental or unauthorized movement relative to the casing and thereby prevent any rattling of the parts when the device is being used. Moreover, by virtue of the present form of the invention, it is unnecessary to provide either the removable cartridge or package 428 or the casing 411 with any special or preformed passageway for the fluid or the like under pressure, contained in the cartridge.

It will be understood that, if desired, the pressure release valve used in connection with the various forms of removable cartridges or the like embodying my invention, may be placed in any desired position with relation to the cartridge, such as in a side wall thereof. It does not necessarily have to be located in the bottom or top walls of the cartridge or package, as shown merely by way of illustration.

As stated above, the dispensing cartridges, containers or packages embodying the present invention may contain any and various types of materials in either powdered or liquid form. Moreover, the cartridges or the like of the present invention are adapted for use with other agents for freezing tissue in addition to carbon dioxide, one such being ethyl chloride ($C_2H_5Cl$). Moreover, the containers of my invention are equally well adapted for use in dispensing various drugs such, for example, as sulfathiazole, sulfathiazine, sulfasuxadine or liquid pennaline tyrothrian, particularly useful in operative surgery.

From the foregoing it will be seen that I have provided an improved dispensing device or apparatus and improved removable, replaceable and refillable cartridges, packages, or containers for use therewith, capable of being formed from various types and kinds of material, which may be made in various shapes and sizes dependent upon the particular use to which the devices and/or packages are to be put. Moreover, while I have described the use of the various forms of improved discharge or dispensing devices and/or packages of my invention somewhat more particularly in connection with the treatment of nasal and allied disturbances and diseases, it will be understood that they have many other uses, only a few of which have been mentioned herein by way of example. The phraseology used herein is for purposes of description and not of limitation and the scope of my invention is intended to be as broad as the prior art will allow.

Having thus described my invention, what I claim is:

1. In a dispensing device, a casing having a discharge opening and a removable cover disposed at opposite ends thereof, a removable cartridge telescopically engaged within said casing, said cartridge having a depression in a wall thereof whereby to provide a passageway within the casing between the depression and a casing wall when the parts are in assembled relation, said cartridge having a releasable valve mounted therein and disposed wholly within the confines of the cartridge, said releasable valve being removable from outside said cartridge, and valve-actuating means carried by said removable cover adapted to engage said valve whereby to release pressure from within the cartridge to said passageway and discharge opening, said means being located wholly within the area of said removable cover when the parts are in assembled relation whereby to prevent the accidental movement thereof to release the valve.

2. A dispensing device according to claim 1 wherein the valve means of the removable cartridge comprises a spring pressed poppet valve having a stem engageable by said valve-actuating device and a spring-pressed ball check valve also engageable with the valve stem.

EDWIN R. LANE.

REFERENCES CITED

The following references are of record in the file of this patent:

UNITED STATES PATENTS

| Number | Name | Date |
|---|---|---|
| 1,742,605 | Lemoine | Jan. 7, 1930 |
| 287,926 | Lavertine | Aug. 7, 1906 |
| 1,106,214 | Heilman | Aug. 4, 1914 |
| 2,245,658 | Erickson | June 17, 1941 |
| 2,292,568 | Kanter et al. | Aug. 11, 1942 |
| 1,835,157 | Heidbrink | Dec. 8, 1931 |
| 1,306,150 | Kessler | June 10, 1919 |
| 602,269 | Read | Apr. 12, 1898 |
| 1,742,604 | Lemoine | Jan. 7, 1930 |
| 1,819,672 | Cain | Aug. 18, 1931 |
| 1,807,399 | Friedrich | May 26, 1931 |

FOREIGN PATENTS

| Number | Country | Date |
|---|---|---|
| 1,018 | British | Jan. 16, 1899 |